United States Patent Office 3,651,089
Patented Mar. 21, 1972

3,651,089
BENZODIOXEPINE DERIVATIVES
OF GUANIDINE
Darius Molho, Boulogne-sur-Seine, Eugene Boschetti, Venissieux, and Louis Fontaine, Lyon, France, assignors to Lipha, Lyonnaise Industrielle Pharmaceutique
No Drawing. Original appplication Feb. 21, 1967, Ser. No. 617,463, now Patent No. 3,502,695, dated Mar. 24, 1970. Divided and this application Oct. 29, 1969, Ser. No. 870,933
Claims priority, application France, Feb. 28, 1966, 51,313; Nov. 22, 1966, 84,498
Int. Cl. C07d 13/00
U.S. Cl. 260—340.3
6 Claims

ABSTRACT OF THE DISCLOSURE

The benzodioxepine derivatives of guanidine of the formula

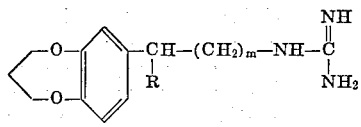

in which $m$ is equal to 0 or 1 and R is a member of the group formed by hydrogen and the hydroxy radical, and their acid addition salts, useful as hypotensive agents.

---

This is a divisional application of S.N. 617,463, filed Feb. 21, 1967, now Pat. No. 3,502,695.

The present invention relates to new derivatives of guanidine, particularly heterocyclic compounds of guanidine, and also to the processes for the preparation thereof.

Certain derivatives of guanidine are known, these being particularly the [2-octahydro-1-azocinylethyl] guanidine sulphate, described by Maxwell and collaborators (Experentia, 15, 267 (1959)) and the (1,4-benzodioxan-2-yl) methyl guanidine sulphate, described by J. Augstein and collaborators (J. of the Medicinal Chemistry 8, 446, 1965). These derivatives have hypotensive properties.

The new compounds of the invention are formed by guanidine derivatives of amines of the noradrenaline type, of which the hydroxyl groups are blocked in a heterocyclic ring, such as the dioxepine ring.

They are represented by the formula

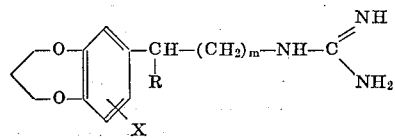

in which;

$m$ is equal to 0 or 1;
X is a member of the group formed by hydrogen and the halogens;
and R is a member of the group formed by hydrogen and the hydroxy radical.

These guanidines can be prepared according to the invention by one or other of the following methods, which enable them to be obtained with satisfactory yields.

According to the first method, an amine base of the general formula

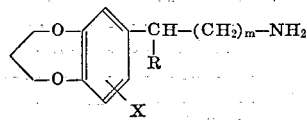

in which X, R, and $m$ have the same meanings as above, is caused to react with a salt of S-alkyl isothiourea. The reaction preferably takes place under heat in a solvent.

According to the second method, the guanidines of the invention can be obtained by condensation of a salt of the above amine with cyanamide.

When X is a halogen in the general formula, it is possible to use a process which consists in halogenating a salt of a guanidine of formula

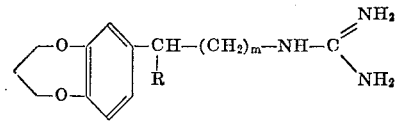

preferably in a solvent, such as acetic acid.

The guanidines in free form are easily prepared by treatment of the compounds, obtained by the preceding methods, with a concentrated alkali base, then the addition salts with the mineral and organic acids, starting with guanidines.

These addition salts are novel and as such form part of the invention.

When $m=0$, and R and X represent hydrogen in the general formula, the guanidines of the invention are prepared from amines of formula

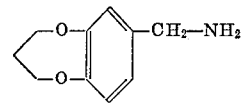

These amines are themselves obtained from nitriles of formula

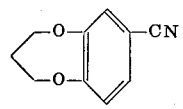

These compounds are novel and as such form part of the invention.

The nitriles of the invention are obtained by dehydrating the corresponding aldoxime, itself synthesized by condensation of the formyl benzodioxane or benzodioxepine with hydroxylamine. According to one method of carrying out the invention, acetic anhydride is used as dehydrating agent. By reduction of the nitrile the expected amines are obtained with a very satisfactory yield. This reduction is preferably effected with lithium-aluminium hydride.

The 7 - (2' - amino-1'-ethanol)-3,4-dihydro-2H-benzodioxepine-1,5 can be obtained according to the invention by reduction, using the first method, of the cyanhydrin of 7-formyl-3,4-dihydro-2H-benzodioxepine-1,5 or, using the second method, of the 7-(2'-nitro-1'-ethanol)-3,4-dihydro-2-benzodioxepine-1,5.

The guanidines of the invention, and also their addition salts with mineral and organic acids, show remarkable hypotensive properties.

The activities of these compounds were determined by different methods. Tests were first of all carried out on an anesthesised rat, and the results of these tests are set out in column 1, 2 and 3 of the following table. The arterial pressure was recorded on a rat, dormant with urethane, and the action of the product on the hypertensions obtained by intravenous injection of Noradrenaline and Tyramine were investigated. A first series of tests was carried out by administering the product intravenously (I.V.) and investigating its action on the hypertensions obtained with the pressor amines [Noradrenaline (Nor) at Tyramine (Tyr)], themselves administered one hour afterwards. In a second series of tests, the animals were pretreated with the products to be tested, the day before the test with the pressor amines. These two tests permit the dissociation of the α-blocking effects visible in the first test (columns 1 and 2), in acute form, and the more lasting effects of the sympathoplegic type, visible with the pretreatment of the second test (column 3).

Tests were then carried out on an anesthesised cat, using the conventional connection of the nictitating membrane, and recorded before and after intravenous injection of the product to be studied, the contractions obtained by stimulation of the preganglionic fibre (column 4 of the following table) of the post-ganglionic fibre (column 5 of the table) and by injection of Adrenaline (column 6 of the table). The arterial pressure was simultaneously recorded.

The tests set out in the column 7 of the following table were carried out on an active cat, the products being administered subcutaneously to active cats. During the days following the administration, the possible relaxation of the nictitating membrane was noted and the fraction of the eye covered was determined.

The toxicities of the compounds tested, set out in column 8 of the table, are expressed by the 50% lethal dose (D.L., 50) in mg./kg. of the products administered intravenously to a mouse.

The following table summarises the results of these tests.

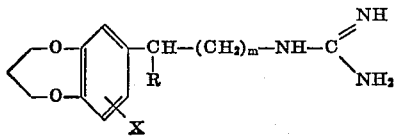

in accordance with usual medical regimen by the use of tablets, pills encapsulations, aqueous suspensions, injectable solutions, syrups, elixirs and other suitable forms. An exemplary formulation of a tablet containing a dosage unit quantity is as follows:

| | Mg. |
|---|---|
| Active compound | 10 |
| Lactose | 79 |
| Cornstarch | 12 |
| Talc | 6 |
| Noyalgin | 6 |
| Starch (paste) | 6 |
| Magnesium stearate | 1 |

The guanidino-6-methyl-1,4-benzodioxane (particularly in its hemisulphate form) has a remarkable hypotensive activity, which was studied on human beings.

It was found that the guanidino-6-methyl-1,4-benzodioxane hemisulphate, in tablets each containing 20 mg. of active principle and an excipient, administered perorally to invalids suffering from hypertension in a daily dose of 10 to 500 mg., preferably 20 to 40 mg. causes a regular lowering of the tension down to normal values. The administration of two tablets per day to invalids showing arterial hypertensions such as maxima at 22, 24, 25 and minima at 14, 11, 15 on commencing treatment makes it possible, after a treatment lasting 5 to 6 days, to obtain a lowering of the hypertensions to maxima of 14 and minima of 10 to 11.

EXAMPLE 1

7-(guanidino methyl)-3,4-dihydro-2H-benzodioxepine 1,5-hemisulphate

| | Tests on the anaesthetised rat | | | Tests on the anaesthetised cat (nictitating membrane) | | | | |
|---|---|---|---|---|---|---|---|---|
| | Modification of the hypertensive effects of Noradrenaline and Tyramine | | | | | | | |
| | Product I.V. 1 hr. before | | | Effects of product in I.V. on— | | | | |
| | Noradrenaline, percent of inhibition | Tyramine, percent of inhibition | Product I.P. the previous day | Excitation of— | | Injected adrenaline | Test on active cat | DL₅₀ I.V. mouse, mg./kg. |
| | | | | Pre-ganglionic fibre | Post-ganglionic fibre | | | |
| Products | 1 | 2 | 3 | 4 | 5 | 6 | 7 | 8 |
| R=H; m=0 | 13 | 29 | Potentiation Nor. and Tyr. | Inhibition 100% | Inhibition 100% | Potentiation | Inactive | 17.5 |
| R=OH; m=1 | 0 | 5 | No action | No modification | No modification | No modification | do | 25 |
| Phentolamine (methane sulphonate) | 80 | 70 | | | | | | 100 |
| Guanethidine | (¹) | 40 | Potentiation Nor. and Tyr. | Inhibition 100% | Inhibition 100% | Potentiation | Active | 20 |

¹ Potentiation of 110%.

The reading of this table shows that, for the majority of the compounds according to the invention, there is more or less strong inhibition of the hypertensive effects of Noradrenaline and Tyramine in the acute test on the rat (columns 1 and 2). It is a question of a sympathicolytic effect of the same type as that of the products known under the name of phentolamine [(N-p-tolyl-N-m-hydroxyphenylaminoethyl)-imidazoline methane sulphonate]. It will be observed that for certain products, there is superimposed on the preceding action a sympathoplegic action of the same type as that of the product known under the name of Guanethidine [(2-octahydro-azocinyl-1-ethyl)-guanidine sulphonate] with, in particular, inhibition of the contracting effects of the excitation of the pre-ganglionic and post-ganglionic fibres and, on the contrary, potentiation of the contracting effect of the injection of adrenaline in the study of the nictitating membrane on the anesthesised cat.

The compounds of this invention are readily compounded into pharmaceutical forms suitable for convenient administration to combat hypertension in invalids subject thereto. Dosages, ordinarily sufficient to effect the desired therapeutic result, range from about 10 mg. to about 500 mg. a day. These dosages are readily supplied

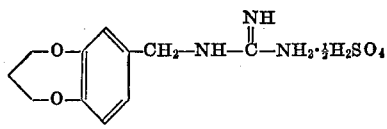

(a) Preparation of the 7-(aminomethyl)-3,4-dihydro-2H-benzodioxepine-1,5

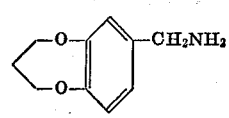

This amine is prepared from the corresponding 7-formyl, from which the aldoxime is made, then the nitrile, and reduction, of this nitrile.

17.8 g. (0.1 mol) of 7-formyl-3,4-dihydro-2H-benzodioxapene-1,5 (Masao Tomita-Yakagaku Zasshi 77, 1041–2–1957) are placed in solution in 50 ml. of ethanol. 8.4 g. (0.12 mol) of hydroxylamine hydochloride in solution in water is introduced into this solution which is stirred for 5 minutes, and 6.05 g. (0.15 mol) of NaOH in solution in 10 ml. of water are added while cooling. The mixture is stirred for 3 hours at ambient temperature. A voluminous precipitate is obtained, into which is introduced 50 g. of ice and a stream of CO₂ for a period of 2 hours. The aldoxime is extracted with ether with a yield of 93%.

This compound is used in the crude state for the following operations.

18 g. of aldoxime are placed in solution in 30 ml. of acetic anhydride and refluxed for 30 minutes. After cooling, the solution is emptied on to 100 g. of crushed ice and the precipitate which forms is filtered by suction which precipitate, recrystallised from a mixture of benzene and hexane, melts at 82° C.

An analytic sample recrystallised from hot water is in the form of pearly platelets, melting at 86° C. (sealed tube).

The yield of 7-nitrile-3,4-dihydro-2H-benzodioxepine-1,5 is 10.5 g., i.e. 64.5%.

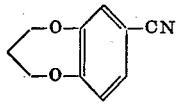

Gravimetric analysis.—Calcd. for $C_{10}H_9NO_2$—mol. wt.=175.18 (percent): C, 68.55; H, 5.17; N, 7.99. Found (percent): C, 68.68; H, 5.01; N, 7.82.

14 g. (0.08 mol) of this nitrile are placed in solution in 100 ml. of dioxane and introduced at 0° C. into a suspension of 3.8 g. (0.096 mol) of AlLiH₄ in 250 ml. of anhydrous ether.

After this addition, the mixture is stirred for 3 hours at 40° C. and then, after cooling on an ice bath, there are successively added 10 ml. of water, then 10 ml. of 20% NaOH, followed by 15 ml. of water. Heating then takes place for 1 hour at 40° C.

The precipitate is filtered by suction, the filtrate being evaporated and rectified. 56% of 7-(aminomethyl)-3,4-dihydro-2H-benzodioxepine-1,5 are obtained, the boiling point of which is 118–120° C./0.65 millibars.

The corresponding hydrochloride melts at 275° C. (sealed tube) and is sublimed in the region of 215° C.

Gravimetric analysis.—Calcd. for $C_{10}H_{13}NO_2 \cdot HCl$— mol. wt.=215.67 (percent): C, 55.68; H, 6.54; N, 6.49. Found (percent): C, 55.59; H, 6.43; N, 6.36.

(b) Preparation of the 7-(guanidino methyl)-3,4-dihydro-2H-benzodioxepine-1,5-hemisulphate 3.6 g. (0.02 mol) of 7-aminomethyl-3,4-dihydro-2H-benzodioxepine-1,5 in solution in 30 ml. of ethanol are heated for 4 hours under reflux with 2.78 g. (0.02 mol) of S-methyl isothiourea hemisulphate in 15 ml. of water. The solution is then concentrated to half and, after cooling, the forming white crystals are filtered by suction and these, after being recrystallised twice from boiling water, give 2.3 g. of analytically pure compound, melting at 220–222° C. (sealed tube).

Gravimetric analysis.—Calcd. for $C_{22}H_{32}N_6O_8S$—mol. wt.=540.89 (percent): C, 48.89; H, 5.97; N, 15.54. Found (percent): C, 48.78; H, 6.14; N, 15.41.

EXAMPLE 2

7-(2'-guanidino ethyl)-3,4-dihydro-2H-benzodioxepine-1,5-hemisulphate

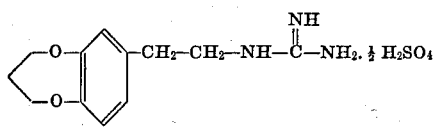

3.86 g. (0.02 mol) of 7-(2'-aminoethyl)-3,4-dihydro-2H-benzodioxepine-1,5 (Masaao Tomita-Yakagaku Zasshi 77, 1041–2, 1957) (the author does not specify the boiling point found to be 128° C./0.6 millibars) in solution in 20 ml. of ethanol and 2.78 g. (0.02 mol) of S-methyl isothiourea in solution in 10 ml. of water, are refluxed for 4 hours.

After return to ambient temperature, a first batch crystallises (1.8 g.). After filtration by suction, the mother liquors have added thereto one volume of ethanol and then one volume of ether, these causing the precipitation of a second batch of 2.2 g. After being recrystallised twice from boiling water, 2.8 g. of brilliant flake are obtained which melt at 225° C. in a sealed tube (Gallen Kamp apparatus).

Gravimetric anlysis.—Calcd. for $C_{24}H_{36}N_6O_8S$—mol. wt. 568.64 (percent): C, 50.69; H, 6.38; N, 14.78. Found (percent): C, 50.84; H, 6.20; N, 14.64.

EXAMPLE 3

7-(2'-guanidino-1'-ethanol)-3,4-dihydro-2H-benzodioxepine-1,5-hemisulphate

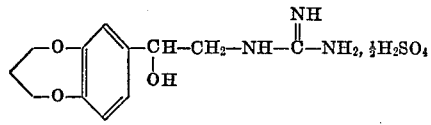

(a) Preparation of the 7-(2'-amino-1'-ethanol)-3,4-dihydro-2H-benzodioxepine-1,5

First method.—The cyanhydrin of the 7-formyl-2,4-dihydro-2H-benzodioxepine-1,5, which will then be reduced, was prepared in the following manner:

Into 53.6 g. (0.19 mol) of bisulphitic salt of 7-formyl-3,4-dihydro-2H-benzodioxepine-1,5, dissolved in 110 ml. of water, there are introduced 55.9 g. (1.14 mol) of NaCN in solution in 115 cc. of water, while stirring and at a temperature of +5° C. After the addition, stirring is continued for 2 hours at this temperature and then for 1 hour at 25° C. The crude cyanhydrin extracted with the ether is obtained in the form of an orange oil with a yield of 89%.

Into 9.7 g. (0.24 mol) of AlLiH₄ and 340 ml. of anyhdrous ether, there are introduced at 10° C. and 45 minutes, 34.7 g. (0.17 mol) of previously obtained cyanhydrin in solution in 170 ml. of ethanol.

After stirring for 3 hours at ambient temperature, heating under reflux takes place for 4 hours. The substance is cooled and 34 ml. of water, 54 ml. of 20% sodium hydroxide and then 68 ml. of water are successively added, keeping the temperature at about 0° C.

The amine is extracted from this suspension with hot chloroform and, after drying, it is precipitated with hexane. The product obtained is filtered by suction, and is recrystallized from benzene. M.P.=130° C. Yield 12 g.

The boiling point of this amine is from 165–170° C./0.5 millibar.

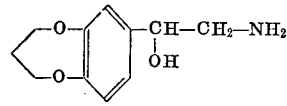

Gravimetric analysis.—Calcd. for $C_{11}H_{15}NO_3$—mol. wt.=209.24 (percent): C, 63.13; H, 7.25; N, 6.70. Found (percent): C, 63.03; H, 7.40; N, 6.72.

Second method.—To 17.8 g. (0.01 mol) of 7-formyl-3,4-dihydro-2H-benzodioxepine-1,5, 15.25 g. (0.25 mol) of nitromethane and 400 ml. of methanol, there is added while stirring at −8° C. a solution of 2.0 g. (0.1 at./g.) of sodium in 80 ml. of anhydrous methanol.

Stirring takes place for another 5 minutes at −10° C. and the pH value is adjusted to about 5 with 18 g. of CH₃COOH. The substance is left standing for 5 hours at 0° C. and the solvents are evaporated in vacuo in order to obtain the 7-(2'-nitro-1'-ethanol) - 3,4 - dihydro-2H-benzodioxepine-1,5, which is taken up in ether, dried over Na₂SO₄, in order to give after evaporation of ether an oily compound which is reduced without purification with AlLiH₄, using the procedure of the first method.

After rectification, there is obtained the 7-aminoethanol-3,4-dihydro - 2H - benzodioxepine-1,5, of which the melting point is 130° C. (benzene).

(b) Preparation of the 7-(2'-guanidino-1'-ethanol)-3,4-dihydro-2H-benzodioxepine-1,5 hemisulphate 4.18 g. (0.02 mol) of amine obtained according to (a) in solution in 42 ml. of ethanol and 2.78 g. (0.02 mol) of S-methyl isothiourea hemisulphate in 8 ml. of water are refluxed for 4 hours.

The solution is allowed to crystallize, after return to ambient temperature, into a compound which, after recrystallization from boiling water, melts at 230–232° C. (sealed tube).

*Gravimetric analysis.*— Calcd. for $C_{24}H_{36}N_6O_{10}S$—mol wt.=600.62 (percent): C, 47.99; H, 6.04; N, 14.00. Found (percent): C, 48.07; H, 6.20; N, 13.88.

What we claim is:

1. A substituted guanidine of the formula:

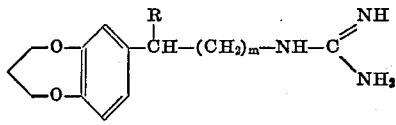

in which $m$ is equal to 0 or 1, and R is a member of the group consisting of hydrogen and the hydroxy radical.

2. 7 - (guanidino methyl)-3,4-dihydro-2H-benzodioxepine-1,5 in accordance with claim 1.
3. 7-(2'-guanidino ethanol) - 3,4 - dihydro-2H-benzodioxepine-1,5 in accordance with claim 1.
4. 7-(2'-guanidino ethanol) - 3,4 - dihydro-2H-benzodioxepine-1,5 in accordance with claim 1.
5. An acid addition salt of a substituted guanidine as claimed in claim 1.
6. 7-(guanidino methyl) - 3,4 - dihydro-2H-benzodioxepine-1,5-hemisulphate in accordance with claim 5.

References Cited

UNITED STATES PATENTS

| | | | |
|---|---|---|---|
| 3,247,221 | 4/1966 | Augstein et al. | 260—340.3 |
| 3,306,913 | 2/1967 | Augstein et al. | 260—340.3 |

ALEX MAZEL, Primary Examiner

J. H. TURNIPSEED, Assistant Examiner

U.S. Cl. X.R.

424—278

UNITED STATES PATENT OFFICE
CERTIFICATE OF CORRECTION

Patent No. 3,651,089      Dated March 21, 1972

Inventor(s) Darius MOLHO et al.

It is certified that error appears in the above-identified patent and that said Letters Patent are hereby corrected as shown below:

Column 2, line 10 (in the formula) change 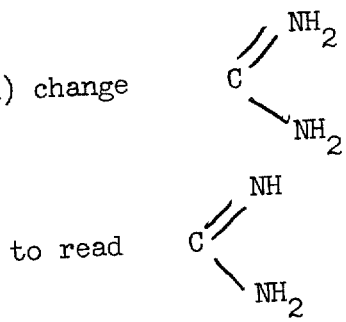

to read

Column 6, line 62, change "2.0" to read —2.3—

Signed and sealed this 29th day of August 1972.

(SEAL)
Attest:

EDWARD M. FLETCHER, JR.
Attesting Officer

ROBERT GOTTSCHALK
Commissioner of Patents